United States Patent [19]

Ha

[11] Patent Number: 4,823,629
[45] Date of Patent: Apr. 25, 1989

[54] AUTOMATIC TRANSMISSION SYSTEM

[76] Inventor: Jin S. Ha, 12750-14 Centralia St., Lakewood, Calif. 90715

[21] Appl. No.: 90,136

[22] Filed: Aug. 27, 1987

[51] Int. Cl.⁴ ............................................. B60K 20/12
[52] U.S. Cl. .................................. 74/335; 74/473 R; 74/500.5; 74/501.6
[58] Field of Search ...................... 74/335, 336 R, 337, 74/324, 333, 325, 349, 473 R, 501.6, 513, 523, 525, 500.5; 192/3.54, 3.61, .073, .092, 70.21, 995

[56] References Cited

U.S. PATENT DOCUMENTS

| | | | |
|---|---|---|---|
| 1,657,871 | 1/1928 | Smith | 74/337 |
| 2,599,216 | 6/1952 | Wuetig | 74/336 X |
| 2,931,237 | 4/1960 | Backus | 74/335 |
| 3,253,475 | 5/1966 | Papst | 192/3.54 X |
| 3,348,643 | 10/1967 | Townsend | 74/336 X |
| 3,407,676 | 10/1968 | Magg | 74/335 |
| 3,793,898 | 2/1974 | Espenschied et al. | 74/335 |
| 3,889,547 | 6/1975 | Sun et al. | 74/336 |

FOREIGN PATENT DOCUMENTS 172109 8/1952 Fed. Rep. of Germany ..... 192/3.54

Primary Examiner—Leslie A. Braun
Assistant Examiner—David Novais
Attorney, Agent, or Firm—Birch, Stewart, Kolasch & Birch

[57] ABSTRACT

An automatic transmission for use in vehicles which comprises clutch gears operated by a pair of L-shaped bars and controllers of the L-shaped bars by pushing an accelerator pedal whereby the clutch gears can selectively contact in frictional engagement corresponding surfaces of a clutch wheel for operating the engine without requiring the use of a torque converter.

17 Claims, 3 Drawing Sheets

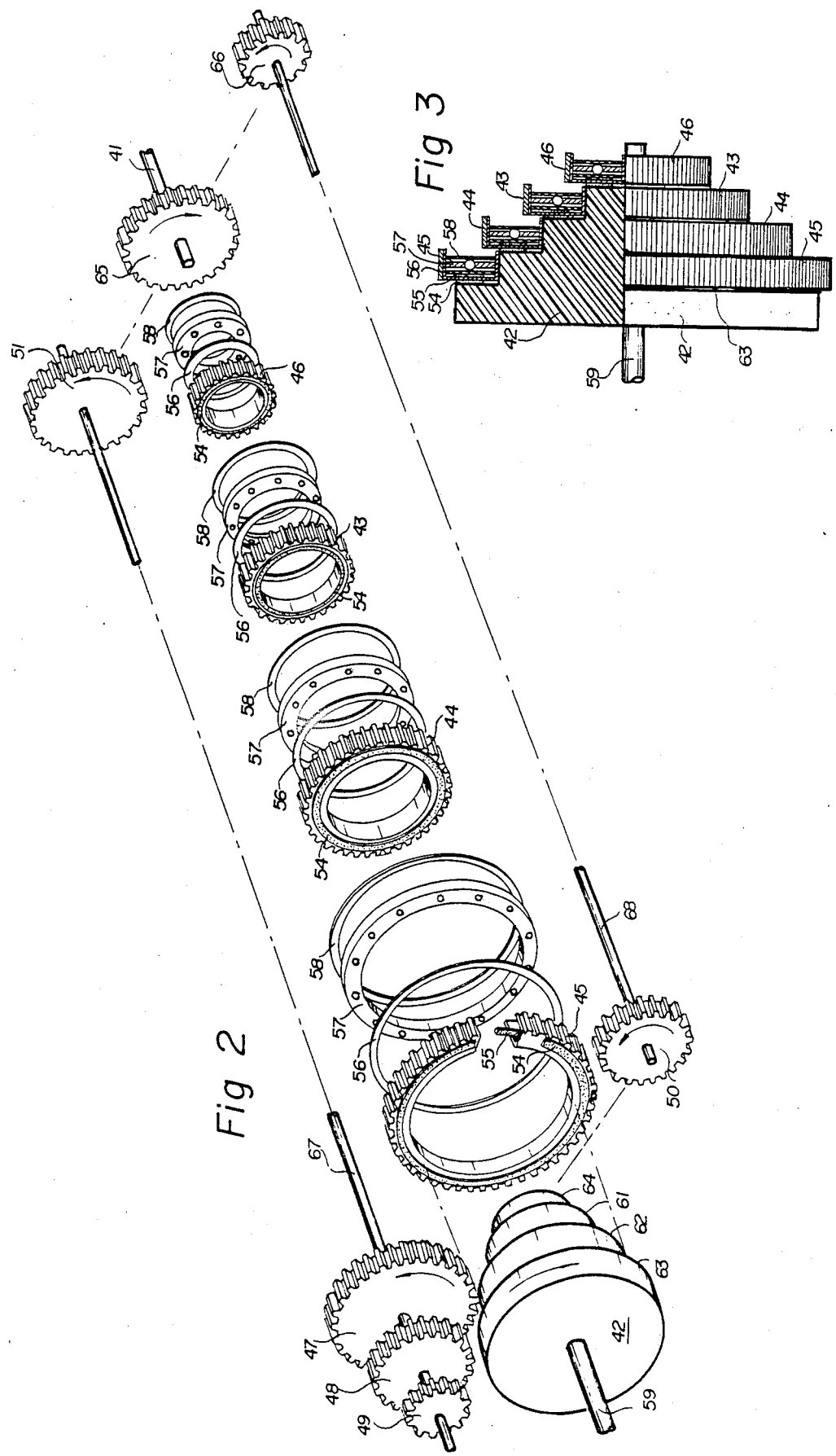

AUTOMATIC TRANSMISSION SYSTEM

BACKGROUND OF THE INVENTION

1. Field of the Invention

The present invention relates to an automatic transmission system for vehicles. More particularly, the present invention relates to an automatic transmission system which is structured with a clutch operated by a pair of L-shaped bars and means for controlling the L-shaped bars so that the automatic transmission system does not require the use of a conventional torque converter thereby contributing to improved fuel economy. The specially designed clutch system of the present invention provides smoother vehicle performance and improved fuel economy when compared with conventional torque converter clutch systems.

2. Description of the Prior Art

There are many types of automatic transmissions which are well known in the art which utilize a torque converter for use in the automatic transmission. However, these automatic transmissions suffer from a number of disadvantages such as, for example, they are required to exhaust a large amount of gasoline for operating a hydraulic oil pressure system connected to the torque converter during shifting between gear range positions such as shifting from first gear to second gear, from second gear to third gear, from third gear to first gear, or from "P" park to "R" reverse. Furthermore, it is difficult to install or assemble such conventional transmission systems since they have a very complicated structure.

SUMMARY OF THE INVENTION

Accordingly, it is an object of the present invention to provide an improved vehicle automatic transmission system for saving gasoline.

Another object of the present invention is to provide an automatic transmission system which is structured with a clutch operated by a pair of L-shaped bars and means for controlling the pair of L-shaped bars for contributing to improved fuel economy.

A further object of the present invention is to provide an automatic transmission system which does not require the use of a hydraulic oil pressure system as a basic component thereof.

Still another object of the present invention is to provide an automatic transmission system which is provided with changeable and simplified L-shaped bars and clutch controlling members for permitting easy repair and adjustment depending upon the size of the vehicle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to an automatic transmission system for use in vehicles which comprises clutch gears operated by a pair of L-shaped bars and means for controlling the L-shaped bars by pushing an accelerator pedal whereby the clutch gears can selectively contact in frictional engagement corresponding surfaces of a clutch wheel for operating the engine without requiring the use of a torque converter. A savings in fuel economy is also achieved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 enlarged perspective view of the clutch components o present invention;

FIG. 3 is a side view of the clutch of the present invention containing cut-away portions in order to illustrate the construction thereof.

DETAILED DESCRIPTION OF THE INVENTION

Figure 1:
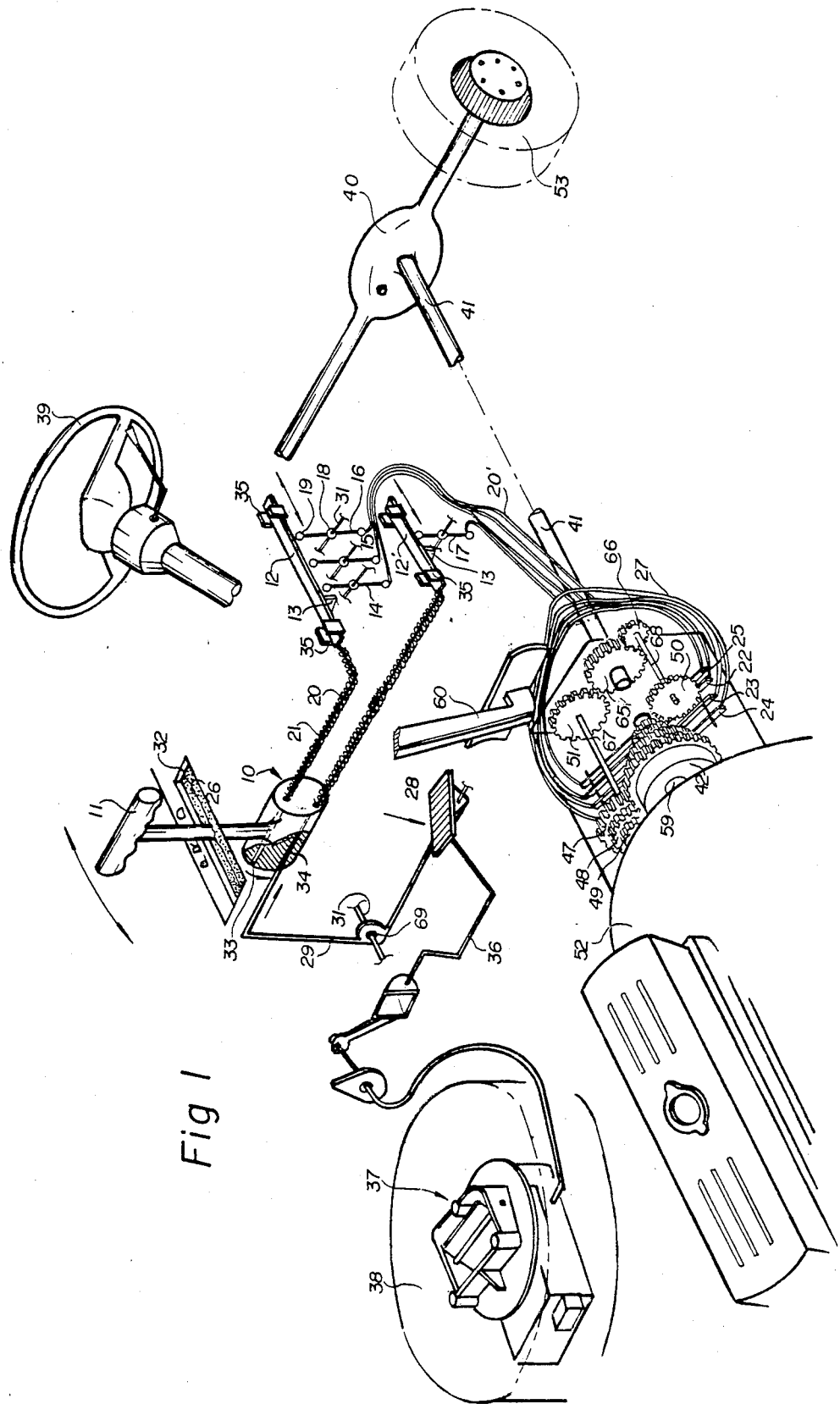
FIG. 1 is a perspective view of the automatic transmission system showing the basic components of the present invention.

Referring now in detail to the drawings for the purpose of illustrating the present invention, the automatic transmission system for use in vehicles as shown in FIG. 1 comprises a gear selector 10 having a shift lever 11, moving rods 12 and 12' connected to the gear selector 10 through steel wires 20, respectively, and forward drive gear controllers 14, 15, 16, and reverse gear controller 17 adapted to operatively engage the moving rods 12 and 12' respectively. The gear controllers 14, 15, 16, and 17 communicate with a plurality of pairs of L-shaped bars 22, 23, 24, and 25 through steel wires 20' and V-shaped steel wires 27. The automatic transmission system comprises a clutch wheel 42 containing concentric rings of a decreasing diameter. The clutch wheel 42 is connected to an engine 52. The concentric rings of the clutch wheel 42 define flat surfaces 61, 62, 63, and 64 which are adopted to frictionally and selectively engage with clutch gears 43, 44, 45, and 46 when pressure is relatively applied to the clutch gears. The clutch gears 43, 44, 45, and 46 are selectively operated by pressure applied through the plurality of pairs of L-shaped bars 22, 23, 24 and 25 and thus, gear together with drive gears 47, 48, 49, and a reverse gear 50. The drive gears 47, 48, and 49 are disposed in a common shaft 67 with a main drive gear 51, and the reverse gear 50 is disposed in a common shaft 68 with a main reverse gear 66. The main drive gears 51 and main reverse gear 66 selectively engage the main gear 65 for rotating an axle 40 and wheels with tires 53 through an axial shaft 41.

The gear selector 10 includes a first aperture 33 and a second aperture 34 for receiving the steel wires 20, one of which connects with the drive moving rod 12 and the other connects to the reverse moving rod 12', respectively. The ends of steel wires 20 extend through the gear selector 10 in the apertures 33 and 34 for operatively connecting to one end of a substantially U-shaped steel frame member 29. The other end of the steel frame member 29 connects to an accelerator pedal 28. The accelerator pedal 28 is also connected by a carburetor wire 36 to a carburetor 37 disposed in the air filter 38. The shift lever 11 is movable within "D" drive, "N" neutral, "R" reverse, and "P" park along a pair of rubber gaskets 26 disposed in a gear box 32. When the shift lever 11 moves to "D" or "R" range position, one end of the substantially U-shaped steel frame member 29 mates with the first aperture 33 or the second aperture 34 of the gear selector 10. The substantially U-shaped steel frame member 29 is provided with a frame holder 31 which engages in a hole 69 disposed at the down corner thereof for pivotally rotating the substantially U-shaped steel frame member 29. Therefore, when the shift lever 11 moves to "D" or "R" range position and the driver pushes the accelerator pedal 28, one end of the steel frame member 29 pushes one end of the steel wires 20 disposed in one of aperture 33 and 34 in the gear selector 10. The steel wire 20 is covered with a flexible spring material 21 such as plastic wire net, or the like (FIG. 4).

Figure 4:
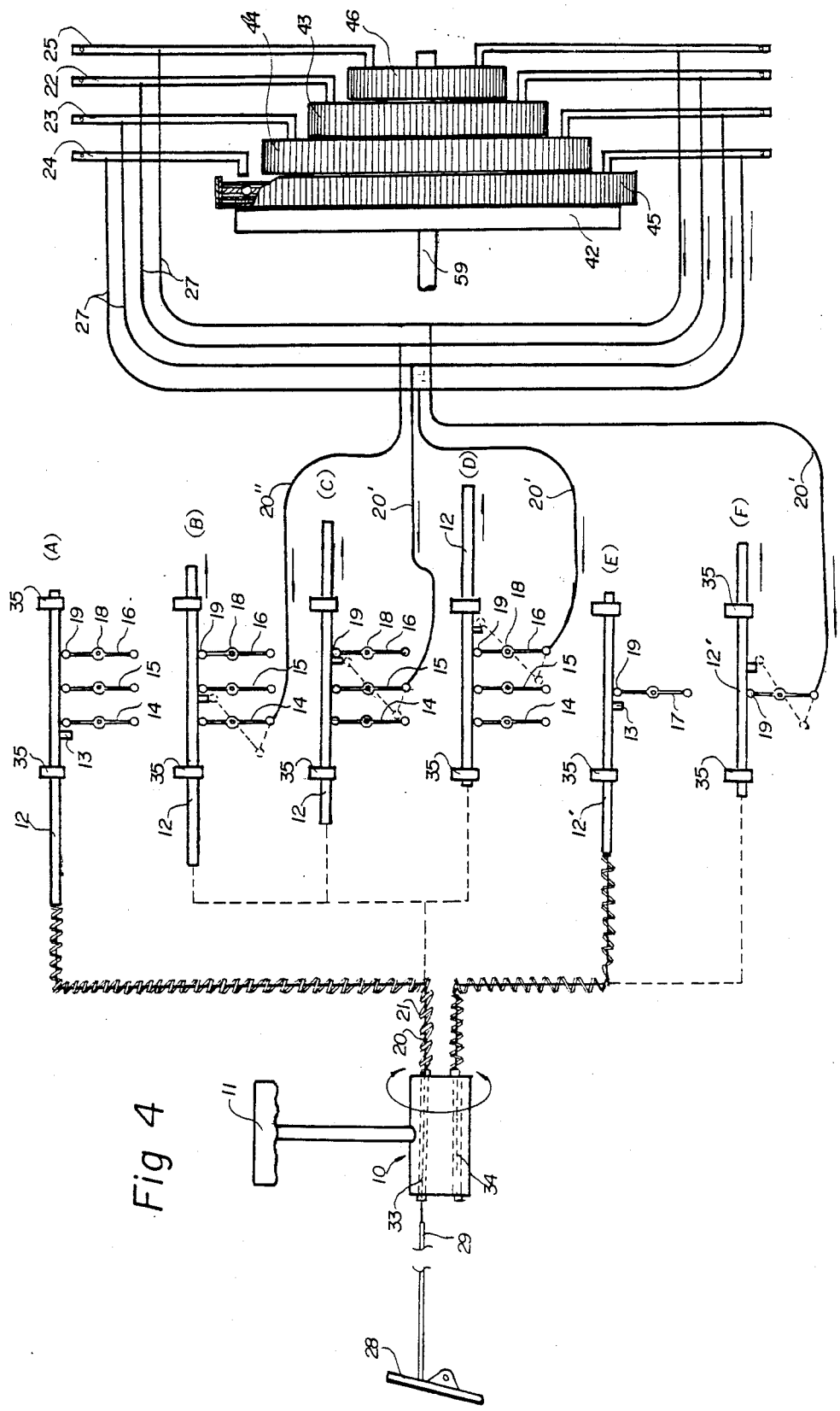
FIG. 4 diagrammatically shows the clutch controlling system for selectively operating the clutch gears as defined by the present invention.

As shown in FIGS. 1 and 4, the moving rods 12 and 12' are supported by bar holders 35 for horizontally moving within the bar holders 35 when the substantially U-shaped steel frame member 29 selectively pushes the ends of the steel wires 20. Also, the moving rods 12 and 12' include projecting members 13, respectively, for operatively and selectively engaging one end 19 of the gear controllers 14, 15, 16, and 17 to pivotally move the gear controllers when the moving rods 12 and 12' are moved forward and backward. The gear controllers are defined as a first gear controller 14, a second gear controller 15, a third gear controller 16, and a reverse gear controller 17. Each gear controller has a hole 18 disposed at the center thereof to permit pivotal rotation of the gear controller by a controller holder 31. The other ends of the gear controllers 14, 15, 16, and 17 are connected to the steel wires 20' covered with the flexible spring material 21. These steel wires 20' connect to the V-shaped steel wires 27, respectively for selectively pulling the plurality of pairs of L-shaped bars, namely a first bar 22, a second bar 23, a third bar 24, and a reverse bar 25.

As shown FIGS. 2 and 3, the clutch gears, namely a first clutch gear 43, a second clutch gear 44, a third clutch gear 45, and a reverse clutch gear 46 contain respectively a first, a second, a third, and a reverse surface which are adapted to engage corresponding concentric surfaces 61, 62, 63, and 64 of the clutch wheel 42. The clutch gears 43, 44, 45, and 46 are provided with outside pads 54 disposed at the outside surfaces thereof, acting as a buffer member to facilitate the engagement of the clutch gears with the clutch wheel. Also, each clutch gear is provided with an inside pad 55, an inside pad cover ring 56, a bearing 57, and a bearing cover ring 58 which are stacked within the interior of the clutch gear. Accordingly, when the pair of L-shaped bars 22, 23, 24, and 25 selectively engage one of the clutch gears. 43, 44, 45, and 46, the clutch gears selectively and frictionally engage one of the concentric surfaces 61, 62, 63, and 64 disposed on the concentric rings of clutch wheel 42 for selectively rotating the clutch gears 43, 44, 45, and 46 which are frictionally engaged with the clutch wheel 42. The clutch wheel 42 is, in turn, connected to the engine 52 through a main shaft 59 (FIG. 1).

The first, second, third, and reverse clutch gears 43, 44, 45, and 46 gear together with a first drive gear 47, a second gear 48, a third a gear 49, and a reverse gear 50, respectively. The first, second and third clutch gears 43, 44, and 45 have increasing diameters, and the first, second, and third drive gears 47, 48, and 49 have decreasing diameters. Also, the drive gears 47, 48, and 49 have a coaxial drive shaft 67. The main drive gear 51 is also disposed on the drive shaft 67. The reverse gear 50 gears together with the clutch gear 46 and is disposed on a reverse shaft 68. A main reverse gear 66 is also coaxially disposed on the reverse shaft 68. The main drive gear 51 and main reverse gear 66 selectively gear together with a main gear 65 (FIG. 1). The main gear 65 has the axial shaft 41 for rotating the axle 40 which connects to a front and rear wheels with tires 53. An element 60 illustrates the brake for the vehicles and numeral 39 represents the steering wheel.

According to the present invention, the automatic transmission system operates as follows: As shown in FIG. 4, when the shift lever 11 moves to "D" range position and one end of the substantially U-shaped steel frame member 29 simultaneously mates with the first aperture 33 of the gear selector 10 while the engine 52 is operating and the driver pushes the accelerator pedal 28, the end of the steel frame member 29 engages the end of the steel wire 20 disposed within the first aperture 33 of the gear selector 10.

The steel frame member 29 simultaneously pushes the steel wire 20 by the power of its resilience so that the drive moving rod 12 moves forward and the projecting member 13 attached thereto simultaneously pushes the end 19 of the first gear controller 14. Accordingly, the drive moving rod 12 moves in the direction indicated by the arrow from the position shown in FIG. 4(A) to the forward moved position shown in FIG. 4(B). At this time, the steel wire 20' pulls the V-shaped wire 27 and simultaneously pulls the pair of first L-shaped bar 22 in the direction indicated by the arrow as shown in FIG. 4. Accordingly, the first pair of L-shaped bars 22 push against the bearing cover ring 58, bearing 57, inside pad cover ring 56, inside pad 55, and outside pad 54, in turn so that the first clutch gear 43 frictionally engages the first surface 61 disposed at one end ring of the clutch wheel 42. At this time, since the clutch wheel 42 is rotating in the clockwise direction and is connected to the engine 52 through the main shaft 59, the first clutch gear 43 rotates in the same direction as the clutch wheel 42 and the main drive gear 51 rotates in the opposite or counterclockwise direction. Accordingly, the main gear 65 rotates in the clockwise direction and the axial shaft 41 operates the axle 40 for rotating the wheels of the vehicle in the forward direction. At this time, the first gear 47 is larger than the first clutch gear 43 so that the vehicle wheels rotate slowly.

After then, when the driver pushes the accelerator pedal 28 more forcefully, the drive moving rod 12 moves forward and the projecting member 13 simultaneously pushes the end 19 of the second gear controller 15 in the direction indicated by the arrow from the position shown in FIG. 4(B) to the forward position shown in FIG. 4(C). At this time, the first gear controller 14 returns to its initial position and thus, the steel wire 20' no longer pulls the V-shaped wire 27 and the first L-shaped bars 22 so that the first clutch gear 43 now releases from the clutch wheel 42. On the other hand, the second clutch gear 44 rotates instead of the first clutch gear 43 in the same manner. Accordingly, the second gear 48 rotates and the drive gear 51 rotates in the clockwise direction. The main gear 65 rotates faster in the clockwise direction since the second clutch gear 44 has the same size as the second drive gear 48.

After then, when the driver accelerates by depressing the accelerator pedal 28, the drive moving rod 12 moves forward in the direction indicated by the arrow from the position shown in FIG. 4(C) to the forward moved position shown in FIG. 4(D). At this time, the second clutch gear 44 releases from the clutch wheel 42. On the other hand, the third clutch gear 45 frictionally engages the surface 63 of the clutch wheel 42 and gears together with the third drive gear 49. Since the third drive gear 49 is smaller than the third clutch gear 63, the coaxial drive gear 51 rotates very fast and the main gear 65 also rotates very fast. Accordingly, the vehicle wheels rotates very fast since the main gear 65 connects to the vehicle wheels through the axial shaft 41 and axle 40. Also, when the accelerator pedal 28 is pushed very forcefully, a large amount of the gasoline is supplied so that the clutch wheel 42 accelerates to rotate itself and accelerates to rotate the first drive gear 49 in order to rotate the main gear 65 very fast.

When the shift lever 11 moves to "R" range position and one end of the substantially U-shaped steel frame member 29 simultaneously mates with the second aperture 34 of the gear selector 10 while the engine 52 works and the driver pushes the accelerator pedal 28, the reverse moving rod 12' moves forward in the direction indicated by the arrow from the position as shown in FIG. 4(E) to the moved position as shown in FIG. 4(F). At this time, the steel wire 20' pulls the V-shaped wire 27 and simultaneously pulls the pair of L-shaped bars 25. Accordingly, the reverse clutch gear 46 operatively attaches to the concentric surface 64 of the clutch wheel 42 by pushing the clutch gear 46 through the pair of L-shaped bars 25. The clutch gear 46 rotates in the clockwise direction and the reverse gear 50 rotates in the counterclockwise direction so that the reverse gear 66 rotates in the same direction. Since the main gear 65 gears together with the main reverse gear 66, the main gear 65 rotates in the counterclockwise direction. Accordingly, the axial gear 65 rotates in the counterclockwise direction and the main shaft 41 operates the axle 40 for rotating the vehicle wheels in the reverse direction. At this time, since the shift lever 11 moves to the reverse range position, the third gear controller 16 returns and the third clutch gear 45 is released from the clutch wheel 42 so that only the reverse clutch gear operates.

What is claimed is:

1. An automatic transmission system for use in vehicles, which comprises:
    a clutch wheel containing a plurality of concentric rings of decreasing diameter, said clutch wheel being attached to an engine of the vehicle;
    a plurality of clutch gears corresponding in size to said concentric rings, said clutch gears being adapted to selectively and frictionally engage with said concentric rings of the clutch wheel;
    an accelerator pedal and a gear selector, said accelerator pedals being connected to one end of a substantially U-shaped frame member, the other end of said substantially U-shaped frame member selectively engaging with one end of one of wires received in a pair of apertures of said gear selector;
    a plurality of drive gear controllers and a reverse gear controller;
    means operatively connected with said gear selector and said plurality of drive gear controllers and reverse gear controller for selectively engaging one of said drive and reverse gear controllers depending upon the position of the gear selector; and
    means for individually connecting said drive and reverse gear controllers with the corresponding clutch gears whereby upon the selection of the gear selector, friction engagement is achieved between the clutch gear and the clutch wheels for rotating the wheel in the forward or reverse direction.

2. The automatic transmission system as recited in claim 1, wherein the clutch gear comprises an outside pad disposed on the outside surface and an inside pad, an inside pad cover ring, a bearing, and a bearing cover ring which are stacked in the interior thereof.

3. The automatic transmission system as recited in claim 1 wherein the means operatively connected with the gear selector and the plurality of drive gear controllers and the reverse gear controller comprises a drive moving rod, a reverse moving rod, and steel wires.

4. The automatic transmission system as recited in claim 3, wherein the drive moving rod and the reverse moving rod contain a projecting member, respectively for selectively engaging one end of the drive gear and reverse gear controllers.

5. The automatic transmission as recited in claim 1, wherein the means for individually connecting the gear controllers with the corresponding clutch gear comprises steel wires, V-shaped steel wires, and a plurality of pairs of L-shaped bars.

6. An automatic transmission system for use in vehicles, which comprises:
    an accelerator pedal connected to a steel frame member;
    a gear selector having a shift lever, said gear selector accepted to receive first wires disposed within apertures therein;
    moving rods connected to said first wires, said moving rods having projecting members, respectively;
    a first, a second, a third, and a reverse pivotal gear controllers for selectively engaging with one of the moving rods, said gear controllers being connected with second wires, respectively;
    a plurality of V-shaped wires connected to said second wires;
    a plurality of pairs of L-shaped bars connected to said V-shaped wires;
    a first, a second, a third, and a reverse clutch gears operatively connected to said plurality of pairs of L-shaped bars for selectively and frictionally engaging with a clutch wheel when the pair of bars push against the first, second, third, and reverse clutch gears; and
    a plurality of gears selectively and operatively gearing together with said first, second, third, and reverse clutch gears whereby upon the selection of the gear selector, friction engagement is achieved between the clutch gear and the clutch wheel for rotating the wheel in the forward or reverse direction.

7. The automatic transmission system as recited in claim 6, wherein the first and second wires are covered with a flexible spring material and are made of steel.

8. The automatic transmission system as recited in claim 6, wherein the moving rod is supported by holding members for slidably moving thereof.

9. The automatic transmission system as recited in claim 6, wherein the clutch gear comprises an outside pad disposed on the outside surface and an inside pad, an inside pad cover ring, a bearing, and a bearing cover ring which are stacked in the interior thereof.

10. The automatic transmission system as recited in claim 6, wherein the clutch wheel contains concentric rings of decreasing diameter.

11. The automatic transmission system as recited in claim 6, wherein the first, second, and third clutch gears correspondingly gear together with a first, a second, and a third drive gears, said first, second, and third clutch gears having increasing diameters and said first, second, and third gears having decreasing diameters.

12. The automatic transmission system as recited in claim 11, wherein the first, second, and third gears rotate in the counterclockwise direction.

13. The automatic transmission as recited in claim 11, wherein the first, second, and third drive gears are disposed in a common shaft with a main drive gear.

14. The automatic transmission system as recited in claim 6, wherein the reverse clutch gear gears together with a reverse gear, said reverse clutch gear has the same diameter as to that of the reverse gear.

15. The automatic transmission as recited in claim 14, wherein the reverse gear rotates in the clockwise direction.

16. The automatic transmission as recited in claim 14, wherein the reverse gear is disposed in a common shaft with a main reverse gear.

17. The automatic transmission as recited in claim 16, wherein a main gear selectively gears together with a main drive gear and the main reverse gear, respectively.

* * * * *